(12) United States Patent
Oikonomidis

(10) Patent No.: US 7,668,768 B2
(45) Date of Patent: Feb. 23, 2010

(54) COMPUTER-IMPLEMENTED METHOD FOR EVALUATING AN INVESTMENT

(76) Inventor: Charalampos Oikonomidis, 4 Parnonos Street, Marousi-Athens (GR) 15125

( * ) Notice: Subject to any disclaimer, the term of this patent is extended or adjusted under 35 U.S.C. 154(b) by 602 days.

(21) Appl. No.: 11/279,259

(22) Filed: Apr. 11, 2006

(65) Prior Publication Data

US 2006/0235782 A1    Oct. 19, 2006

(30) Foreign Application Priority Data

Apr. 14, 2005    (GR) .............................. 050100192

(51) Int. Cl.
- G06Q 40/00    (2006.01)
- G06Q 20/00    (2006.01)
- G07G 1/00     (2006.01)
- G06F 17/30    (2006.01)

(52) U.S. Cl. ...................................................... 705/35

(58) Field of Classification Search ................... 705/35
See application file for complete search history.

(56) References Cited

U.S. PATENT DOCUMENTS 5,812,988 A * 9/1998 Sandretto ................... 705/36 R

OTHER PUBLICATIONS

Richard C. Scott. Journal of Small Business Management: Jul. 1977: p. 37. Pricing the Going Concern.*

Charles T. Bidek, et al. Society of Chartered Property and Casualty Underwriters. CPCU Journal. Jun. 1988; p. 80. Valuing an Insurance Agency.*

Francesco Parisi, et al. European Journal of Law and Economics. vol. 18, pp. 131-148. 2004. The Value of Waiting in Lawmaking.*

Financial Management, Theory and Practice; E.F. Brigham, L. C. Gapenski, Eighth Edition, 1997, pp. 398-400.

* cited by examiner

*Primary Examiner*—Kelly Campen
*Assistant Examiner*—John O Preston
(74) *Attorney, Agent, or Firm*—Gordon & Jacobson, PC

(57) ABSTRACT

A computer-implemented method and tool for evaluating an investment includes functionality that generates and stores data representing values/dates of a plurality of inflows and outflows over the investment period. Such data is used to derive first values that represent expected benefits over corresponding intervals of the investment period. A first net present value result is generated by discounting some or all of the first values, and then stored for output as part of the investment evaluation. The first values account for at least one of: i) interest payments and credits on calculated daily bank account balances (CDBAs) derived from the data; ii) tax payments due on CDBAs derived from the data; iii) VAT payments derived from portions of the data corresponding to forecasted sales of the investment, iv) income tax payments derived from said data, and v) allocation of forecasted net income into a plurality of predetermined categories.

33 Claims, 19 Drawing Sheets

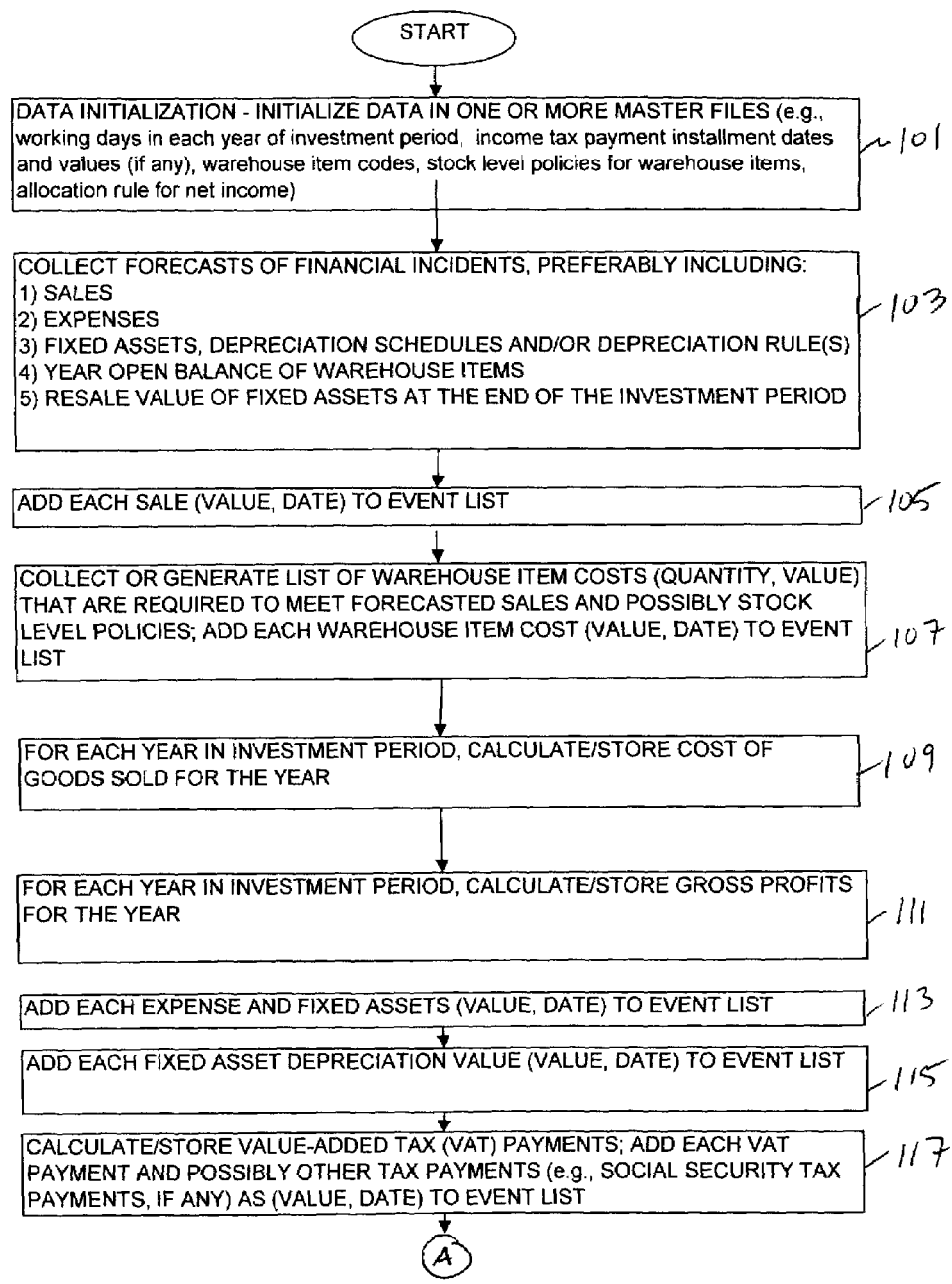

FIG 2A

| #1 | | SYSTEM INFORMATION (SYSTEM.INF) | DESCRIPTION | REFERENCE | LENGTH | FA 234 FIRST | LAST |
|---|---|---|---|---|---|---|---|
| 1 | FA01$ | NAME OF FILE | | | 25 | 1 | 25 |
| 2 | FA02$ | NUMBER OF ENTRIES | | | 8 | 26 | 33 |
| 3 | FA03$ | INFO 01 | | | 20 | 34 | 53 |
| 4 | FA04$ | INFO 02 | | | 20 | 54 | 73 |
| 5 | FA05$ | INFO 03 | | | 20 | 74 | 93 |
| 6 | FA06$ | INFO 04 | | | 20 | 94 | 113 |
| 7 | FA07$ | INFO 05 | | | 20 | 114 | 133 |
| 8 | FIL01$ | FILLER | | | 100 | 134 | 233 |
| 9 | VL01$ | VALID (Y/N) | | | 1 | 234 | 234 |

FIG. 2B

| #2 | | CALENDAR | DESCRIPTION | REFERENCE | LENGTH | FB 137 FIRST | LAST |
|---|---|---|---|---|---|---|---|
| 1 | FB01$ | DATE | | | 8 | 1 | 8 |
| 2 | FB02$ | DAY (SUN,MON,TUE,WEN,THU,FRI,SAT) | | | 3 | 9 | 11 |
| 3 | FB03$ | WORKING (Y/N) | | | 1 | 12 | 12 |
| 4 | FB04$ | DAILY INTEREST EXPENSE | | | 12 | 13 | 24 |
| 5 | FB05$ | DAILY INTEREST INCOME | | | 12 | 25 | 36 |
| 6 | FIL02$ | FILLER | | | 100 | 37 | 136 |
| 7 | VL02$ | VALID (Y/N) | | | 1 | 137 | 137 |

FIG. 2C

3 SCHEDULE OF PAYMENT OF INCOME TAX

| | | DESCRIPTION | REFERENCE | LENGTH | FC FIRST | 151 LAST |
|---|---|---|---|---|---|---|
| 1 | FC01$ | NUMBER OF INSTALMENTS | | 2 | 1 | 2 |
| 2 | FC02$ | INSTALMENT 01 (MMDD) | | 4 | 3 | 6 |
| 3 | FC03$ | INSTALMENT 02 (MMDD) | | 4 | 7 | 10 |
| 4 | FC04$ | INSTALMENT 03 (MMDD) | | 4 | 11 | 14 |
| 5 | FC05$ | INSTALMENT 04 (MMDD) | | 4 | 15 | 18 |
| 6 | FC06$ | INSTALMENT 05 (MMDD) | | 4 | 19 | 22 |
| 7 | FC07$ | INSTALMENT 06 (MMDD) | | 4 | 23 | 26 |
| 8 | FC08$ | INSTALMENT 07 (MMDD) | | 4 | 27 | 30 |
| 9 | FC09$ | INSTALMENT 08 (MMDD) | | 4 | 31 | 34 |
| 10 | FC10$ | INSTALMENT 09 (MMDD) | | 4 | 35 | 38 |
| 11 | FC11$ | INSTALMENT 10 (MMDD) | | 4 | 39 | 42 |
| 12 | FC12$ | INSTALMENT 11 (MMDD) | | 4 | 43 | 46 |
| 13 | FC13$ | INSTALMENT 12 (MMDD) | | 4 | 47 | 50 |
| 14 | FIL03$ | FILLER | | 100 | 51 | 150 |
| 15 | VL03$ | VALID (Y/N) | | 1 | 151 | 151 |

FIG. 2D

4 INVENTORY ITEM MASTER

| | | DESCRIPTION | REFERENCE | LENGTH | FD FIRST | 230 LAST |
|---|---|---|---|---|---|---|
| 1 | FD01$ | NAME | | 40 | 1 | 40 |
| 2 | FD02$ | NAME OF ALALYTICAL FILE (BEFORE SORTING) | #5 | 12 | 41 | 52 |
| 3 | FD03$ | NAME OF ALALYTICAL FILE (AFTER SORTING) | #6 | 12 | 53 | 64 |
| 4 | FD04$ | HOW MANY ENTRIES | | 10 | 65 | 74 |
| 5 | FD05$ | FIRST EVENT NUMBER | #12 | 8 | 75 | 82 |
| 6 | FD06$ | LAST EVENT NUMBER | #12 | 8 | 83 | 90 |
| 7 | FD07$ | MINIMUM STOCK IN NUMBERS (IF EMPTY GO BELOW) | | 12 | 91 | 102 |
| 8 | FD08$ | MINIMUM STOCK AS DAYS OF SALES | | 3 | 103 | 105 |
| 9 | FD09$ | MINIMUM PURCHASE QUANTITY | | 12 | 106 | 117 |
| 10 | FD10$ | NUMBER OF DAYS BETWEEN ORDER AND RECEIPT | | 3 | 118 | 120 |
| 11 | FD11$ | CODE OF PURCHASE (NUMBER IN FILE) | #8 | 8 | 121 | 128 |
| 12 | FD12$ | IS THIS AN EXPENSE ? (Y/N) | | 1 | 129 | 129 |
| 13 | FIL04$ | FILLER | | 100 | 130 | 229 |
| 14 | VL04$ | VALID (Y/N) | | 1 | 230 | 230 |

FIG. 2E

5 INVENTORY ITEM ANALYTICAL (BEFORE SORTING)

| | | DESCRIPTION | REFERENCE | LENGTH | FE FIRST | 225 LAST |
|---|---|---|---|---|---|---|
| 1 | FE01$ | NUMBER IN INVENTORY MASTER | #4 | 8 | 1 | 8 |
| 2 | FE02$ | NUMBER IN EVENT ARCHIVE | #12 | 8 | 9 | 16 |
| 3 | FE03$ | NUMBER IN INVENTORY ITEM ANALYTICAL (AFTER SORTING) | #6 | 8 | 17 | 24 |
| 4 | FE04$ | DATE | | 8 | 25 | 32 |
| 5 | FE05$ | DESCRIPTION | | 20 | 33 | 52 |
| 6 | FE06$ | DEBIT QUANTITY | | 12 | 53 | 64 |
| 7 | FE07$ | CREDIT QUANTITY | | 12 | 65 | 76 |
| 8 | FE08$ | BALANCE QUANTITY | | 12 | 77 | 88 |
| 9 | FE09$ | DEBIT VALUE | | 12 | 89 | 100 |
| 10 | FE10$ | CREDIT VALUE | | 12 | 101 | 112 |
| 11 | FE11$ | BALANCE VALUE | | 12 | 113 | 124 |
| 12 | FIL05$ | FILLER | | 100 | 125 | 224 |
| 13 | VL05$ | VALID (Y/N) | | 1 | 225 | 225 |

FIG. 2F

6 INVENTORY ITEM ANALYTICAL (AFTER SORTING)

| | | DESCRIPTION | REFERENCE | LENGTH | FF FIRST | 225 LAST |
|---|---|---|---|---|---|---|
| 1 | FF01$ | NUMBER IN INVENTORY MASTER | #4 | 8 | 1 | 8 |
| 2 | FF02$ | NUMBER IN EVENT ARCHIVE | #12 | 8 | 9 | 16 |
| 3 | FF03$ | NUMBER IN INVENTORY ITEM ANALYTICAL (BEFORE SORTING) | #5 | 8 | 17 | 24 |
| 4 | FF04$ | DATE | | 8 | 25 | 32 |
| 5 | FF05$ | DESCRIPTION | | 20 | 33 | 52 |
| 6 | FF06$ | DEBIT QUANTITY | | 12 | 53 | 64 |
| 7 | FF07$ | CREDIT QUANTITY | | 12 | 65 | 76 |
| 8 | FF08$ | BALANCE QUANTITY | | 12 | 77 | 88 |
| 9 | FF09$ | DEBIT VALUE | | 12 | 89 | 100 |
| 10 | FF10$ | CREDIT VALUE | | 12 | 101 | 112 |
| 11 | FF11$ | BALANCE VALUE | | 12 | 113 | 124 |
| 12 | FIL06$ | FILLER | | 100 | 125 | 224 |
| 13 | VL06$ | VALID (Y/N) | | 1 | 225 | 225 |

FIG 26

#7 IMPACT CODE MASTER

| | NAME | DESCRIPTION | REFERENCE | LENGTH | FG FIRST | 167 LAST |
|---|---|---|---|---|---|---|
| 1 | FG01$ | NAME | | 50 | 1 | 50 |
| 2 | FG02$ | GOES TO BANK (Y/N) | | 1 | 51 | 51 |
| 3 | FG03$ | METHOD (D=NUMBER OF DAYS / F=FIXED DATE / S=SYSTEM ) | | 1 | 52 | 52 |
| 4 | FG04$ | NUMBER OF DAYS | | 4 | 53 | 56 |
| 5 | FG05$ | HOW MANY YEARS AFTER | | 1 | 57 | 57 |
| 6 | FG06$ | HOW MANY MONTHS AFTER | | 2 | 58 | 59 |
| 7 | FG07$ | WHICH FIXED DATE OF THE MONTH | #14 | 2 | 60 | 61 |
| 8 | FG08$ | BIMONTHLY PAYMENT (Y/N) | | 1 | 62 | 62 |
| 9 | FG09$ | QUARTERLY PAYMENT (Y/N) | | 1 | 63 | 63 |
| 10 | FG10$ | HALF YEAR PAYMENT (Y/N) | | 1 | 64 | 64 |
| 11 | FG11$ | ANNUAL PAYMENT (Y/N) | | 1 | 65 | 65 |
| 12 | FG12$ | VAT MOVEMENT (Y/N) | | 1 | 66 | 66 |
| 13 | FIL07$ | FILLER | #18 | 100 | 67 | 166 |
| 14 | VL07$ | VALID (Y/N) | | 1 | 167 | 167 |

FIG 27

#8 MOVEMENT CODE MASTER

| | NAME | DESCRIPTION | REFERENCE | LENGTH | FH FIRST | 240 LAST |
|---|---|---|---|---|---|---|
| 1 | FH01$ | NAME | | 50 | 1 | 50 |
| 2 | FH02$ | GOES TO PROFIT AND LOSS (PERCENTAGE +/-) | #17 | 6 | 51 | 56 |
| 3 | FH03$ | THIS IS AN INCOME TAX ADVANCE PAYMENT (PERCENTAGE +/-) | | 6 | 57 | 62 |
| 4 | FH04$ | CASH FLOW IMPACT 1 (NUMBER IN MASTER FILE) | #7 | 8 | 63 | 70 |
| 5 | FH05$ | PERCENTAGE (+/-) | | 6 | 71 | 76 |
| 6 | FH06$ | CASH FLOW IMPACT 2 (NUMBER IN MASTER FILE) | #7 | 8 | 77 | 84 |
| 7 | FH07$ | PERCENTAGE (+/-) | | 6 | 85 | 90 |
| 8 | FH08$ | CASH FLOW IMPACT 3 (NUMBER IN MASTER FILE) | #7 | 8 | 91 | 98 |
| 9 | FH09$ | PERCENTAGE (+/-) | | 6 | 99 | 104 |
| 10 | FH10$ | CASH FLOW IMPACT 4 (NUMBER IN MASTER FILE) | #7 | 8 | 105 | 112 |
| 11 | FH11$ | PERCENTAGE (+/-) | | 6 | 113 | 118 |
| 12 | FH12$ | CASH FLOW IMPACT 5 (NUMBER IN MASTER FILE) | #7 | 8 | 119 | 126 |
| 13 | FH13$ | PERCENTAGE (+/-) | | 6 | 127 | 132 |
| 14 | FH14$ | GOES TO RESERVES (Y/N) | #23 | 1 | 133 | 133 |
| 15 | FH15$ | PERCENTAGE OF EXPENSE THAT IS INCOME TAX WISE NON DEDUCTIBLE | #22 | 6 | 134 | 139 |
| 16 | FIL08$ | FILLER | | 100 | 140 | 239 |
| 17 | VL08$ | VALID (Y/N) | | 1 | 240 | 240 |

FIG. 2I

9 | | BANK INTEREST RATES | | | FI | 153 |
---|---|---|---|---|---|---|
 | | DESCRIPTION | REFERENCE | LENGTH | FIRST | LAST |
1 | FI01$ | DATE FROM | | 8 | 1 | 8 |
2 | FI02$ | DATE TO | | 8 | 9 | 16 |
3 | FI03$ | INTEREST RATE EXPENSE % | | 8 | 17 | 24 |
4 | FI04$ | LAW 128/75 ON BALANCE OF END OF MONTH % | | 8 | 25 | 32 |
5 | FI05$ | INTEREST RATE INCOME % | | 8 | 33 | 40 |
6 | FI06$ | INCOME TAX RETAINED ON INTEREST INCOME % | | 8 | 41 | 48 |
7 | FI07$ | DAYS OF VALEUR OF WITHDRAWALS | | 2 | 49 | 50 |
8 | FI08$ | DAYS OF VALEUR OF DEPOSITS | | 2 | 51 | 52 |
9 | FIL09$ | FILLER | | 100 | 53 | 152 |
10 | VL09$ | VALID (Y/N) | | 1 | 153 | 153 |

FIG. 2J

10 | | INTEREST BEARING PERIODS OF BANK ACCOUNT | | | FJ | 108 |
---|---|---|---|---|---|---|
 | | DESCRIPTION | REFERENCE | LENGTH | FIRST | LAST |
1 | FJ01$ | PERIOD (YYYYMM) | | 6 | 1 | 6 |
2 | FJ02$ | FLAG (Y/N) | | 1 | 7 | 7 |
3 | FIL10$ | FILLER | | 100 | 8 | 107 |
4 | VL10$ | VALID (Y/N) | | 1 | 108 | 108 |

FIG. 2K

11 GROSS OPERATING INCOME CALCULATION

| | | DESCRIPTION | REFERENCE | LENGTH | FK FIRST | 153 LAST |
|---|---|---|---|---|---|---|
| 1 | FK01$ | EVENT NUMBER | 0 | 8 | 1 | 8 |
| 2 | FK02$ | DATE | | 8 | 9 | 16 |
| 3 | FK03$ | SUM DEBIT | | 12 | 17 | 28 |
| 4 | FK04$ | SUM CREDIT | | 12 | 29 | 40 |
| 5 | FK05$ | BALANCE | | 12 | 41 | 52 |
| 6 | FIL11$ | FILLER | | 100 | 53 | 152 |
| 7 | VL11$ | VALID (Y/N) | | 1 | 153 | 153 |

FIG. 2L

12 EVENT ARCHIVE

| | | DESCRIPTION | REFERENCE | LENGTH | FL FIRST | 165 LAST |
|---|---|---|---|---|---|---|
| 1 | FL01$ | DATE | | 8 | 1 | 8 |
| 2 | FL02$ | ITEM (NUMBER IN MASTER FILE) | #4 | 8 | 9 | 16 |
| 3 | FL03$ | MOVEMENT CODE (NUMBER IN MASTER FILE) | #8 | 8 | 17 | 24 |
| 4 | FL04$ | QUANTITY | | 12 | 25 | 36 |
| 5 | FL05$ | VALUE | | 12 | 37 | 48 |
| 6 | FL06$ | PLACE IN INVENTORY ITEM ANALYTICAL (BEFORE SORTING) | #5 | 8 | 49 | 56 |
| 7 | FL07$ | PLACE IN INVENTORY ITEM ANALYTICAL (AFTER SORTING) | #6 | 8 | 57 | 64 |
| 8 | FIL12$ | FILLER | | 100 | 65 | 164 |
| 9 | VL12$ | VALID (Y/N) | | 1 | 165 | 165 |

FIG 2M

| #13 | BANK ACCOUNT MASTER DATA | DESCRIPTION | REFERENCE #9 | LENGTH | FM FIRST | 115 LAST |
|---|---|---|---|---|---|---|
| 1 | FM01$ | NAME OF FILE WITH INTEREST RATES | | 12 | 1 | 12 |
| 2 | FM02$ | CALCULATION OF INTEREST EVERY ?? MONTHS | | 2 | 13 | 14 |
| 3 | FIL13$ | FILLER | | 100 | 15 | 114 |
| 4 | VL13$ | VALID (Y/N) | | 1 | 115 | 115 |

FIG. 2N

| #14 | BANK ACCOUNT ANALYTICAL DATA (BEFORE SORTING) | DESCRIPTION | REFERENCE | LENGTH | FN FIRST | 181 LAST |
|---|---|---|---|---|---|---|
| 1 | FN01$ | DATE OF MOVEMENT | | 8 | 1 | 8 |
| 2 | FN02$ | DATE OF VALEUR | | 8 | 9 | 16 |
| 3 | FN03$ | EVENT NUMBER | #12 | 12 | 17 | 28 |
| 4 | FN04$ | MOVEMENT CODE (NUMBER IN MASTER FILE) | #8 FL03$ | 8 | 29 | 36 |
| 5 | FN05$ | IMPACT CODE (NUMBER IN MASTER FILE) | #7 | 8 | 37 | 44 |
| 6 | FN06$ | DEBIT | | 12 | 45 | 56 |
| 7 | FN07$ | CREDIT | | 12 | 57 | 68 |
| 8 | FN08$ | BALANCE | | 12 | 69 | 80 |
| 9 | FIL14$ | FILLER | | 100 | 81 | 180 |
| 10 | VL14$ | VALID (Y/N) | | 1 | 181 | 181 |

FIG. 20

15 BANK ACCOUNT SORTED BY EVENT DATE

| | | DESCRIPTION | REFERENCE | LENGTH | FO FIRST | 181 LAST |
|---|---|---|---|---|---|---|
| 1 | FO01$ | DATE OF MOVEMENT | | 8 | 1 | 8 |
| 2 | FO02$ | DATE OF VALEUR | | 8 | 9 | 16 |
| 3 | FO03$ | EVENT NUMBER | #12 | 12 | 17 | 28 |
| 4 | FO04$ | MOVEMENT CODE (NUMBER IN MASTER FILE) | #8 FL03$ | 8 | 29 | 36 |
| 5 | FO05$ | IMPACT CODE (NUMBER IN MASTER FILE) | #7 | 8 | 37 | 44 |
| 6 | FO06$ | DEBIT | | 12 | 45 | 56 |
| 7 | FO07$ | CREDIT | | 12 | 57 | 68 |
| 8 | FO08$ | BALANCE | | 12 | 69 | 80 |
| 9 | FIL15$ | FILLER | | 100 | 81 | 180 |
| 10 | VL15$ | VALID (Y/N) | | 1 | 181 | 181 |

FIG. 2P

16 BANK ACCOUNT SORTED BY VALEUR DATE

| | | DESCRIPTION | REFERENCE | LENGTH | FP FIRST | 181 LAST |
|---|---|---|---|---|---|---|
| 1 | FP01$ | DATE OF MOVEMENT | | 8 | 1 | 8 |
| 2 | FP02$ | DATE OF VALEUR | | 8 | 9 | 16 |
| 3 | FP03$ | EVENT NUMBER | #12 | 12 | 17 | 28 |
| 4 | FP04$ | MOVEMENT CODE (NUMBER IN MASTER FILE) | #8 FL03$ | 8 | 29 | 36 |
| 5 | FP05$ | IMPACT CODE (NUMBER IN MASTER FILE) | #7 | 8 | 37 | 44 |
| 6 | FP06$ | DEBIT | | 12 | 45 | 56 |
| 7 | FP07$ | CREDIT | | 12 | 57 | 68 |
| 8 | FP08$ | BALANCE | | 12 | 69 | 80 |
| 9 | FIL16$ | FILLER | | 100 | 81 | 180 |
| 10 | VL16$ | VALID (Y/N) | | 1 | 181 | 181 |

FIG. 2Q

| #17 | | ARCHIVE OF PROFIT AND LOSS (BEFORE SORTING) | | | FQ | 185 |
|---|---|---|---|---|---|---|
| | | DESCRIPTION | REFERENCE | LENGTH | FIRST | LAST |
| 1 | FQ01$ | EVENT NUMBER IN ARCHIVE | 0 | 8 | 1 | 8 |
| 2 | FQ02$ | DATE | | 8 | 9 | 16 |
| 3 | FQ03$ | ITEM (NUMBER IN MASTER FILE) | #4 | 8 | 17 | 24 |
| 4 | FQ04$ | MOVEMENT CODE (NUMBER IN MASTER FILE) | #8 | 8 | 25 | 32 |
| 5 | FQ05$ | QUANTITY | | 12 | 33 | 44 |
| 6 | FQ06$ | VALUE (DEBIT) | | 12 | 45 | 56 |
| 7 | FQ07$ | VALUE (CREDIT) | | 12 | 57 | 68 |
| 8 | FQ08$ | PLACE IN INVENTORY ITEM ANALYTICAL (BEFORE SORTING) | #5 | 8 | 69 | 76 |
| 9 | FQ09$ | PLACE IN INVENTORY ITEM ANALYTICAL (AFTER SORTING) | #6 | 8 | 77 | 84 |
| 10 | FIL17$ | FILLER | | 100 | 85 | 184 |
| 11 | VL17$ | VALID (Y/N) | | 1 | 185 | 185 |

FIG. 2R

| #18 | | ARCHIVE OF VAT (BEFORE SORTING) | | | FR | 161 |
|---|---|---|---|---|---|---|
| | | DESCRIPTION | REFERENCE | LENGTH | FIRST | LAST |
| 1 | FR01$ | EVENT NUMBER IN ARCHIVE | #12 | 8 | 1 | 8 |
| 2 | FR02$ | DATE OF PAYMENT | | 8 | 9 | 16 |
| 3 | FR03$ | VALUE DEBIT | | 12 | 17 | 28 |
| 4 | FR04$ | VALUE CREDIT | | 12 | 29 | 40 |
| 5 | FR05$ | VALUE BALANCE | | 12 | 41 | 52 |
| 6 | FR06$ | PLACE IN ARCHIVE AFTER SORTING | #19 | 8 | 53 | 60 |
| 7 | FIL18$ | FILLER | | 100 | 61 | 160 |
| 8 | VL18$ | VALID (Y/N) | | 1 | 161 | 161 |

FIG 2S

19 | ARCHIVE OF VAT (AFTER SORTING) | | | | |
---|---|---|---|---|---|
| | DESCRIPTION | REFERENCE | LENGTH | FS FIRST | 161 LAST |
1 | FS01$ | EVENT NUMBER IN ARCHIVE | #12 | 8 | 1 | 8
2 | FS02$ | DATE OF PAYMENT | | 8 | 9 | 16
3 | FS03$ | VALUE DEBIT | | 12 | 17 | 28
4 | FS04$ | VALUE CREDIT | | 12 | 29 | 40
5 | FS05$ | VALUE BALANCE | | 12 | 41 | 52
6 | FS06$ | PLACE IN ARCHIVE BEFORE SORTING | #18 | 8 | 53 | 60
7 | FIL19$ | FILLER | | 100 | 61 | 160
8 | VL19$ | VALID (Y/N) | | 1 | 161 | 161

FIG 2T

20 | ARCHIVE OF MOVEMENTS FOR NPV | | | | |
---|---|---|---|---|---|
| | DESCRIPTION | REFERENCE | LENGTH | FT FIRST | 165 LAST |
1 | FT01$ | DATE | | 8 | 1 | 8
2 | FT02$ | NUMBER IN EVENT ARCHIVE | #12 | 8 | 9 | 16
3 | FT03$ | DEBIT BEFORE NPV | | 12 | 17 | 28
4 | FT04$ | CREDIT BEFORE NPV | | 12 | 29 | 40
5 | FT05$ | DEBIT AFTER NPV | | 12 | 41 | 52
6 | FT06$ | CREDIT AFTER NPV | | 12 | 53 | 64
7 | FIL20$ | FILLER | | 100 | 65 | 164
8 | VL20$ | VALID (Y/N) | | 1 | 165 | 165

FIG 2U

| #21 | | RATES FOR NPV DESCRIPTION | REFERENCE | LENGTH | FU FIRST | 125 LAST |
|---|---|---|---|---|---|---|
| 1 | FU01$ | DATE FROM | | 8 | 1 | 8 |
| 2 | FU02$ | DATE TO | | 8 | 9 | 16 |
| 3 | FU03$ | PERCENTAGE | | 8 | 17 | 24 |
| 4 | FIL21$ | FILLER | | 100 | 25 | 124 |
| 5 | VL21$ | VALID (Y/N) | | 1 | 125 | 125 |

FIG 2V

| #22 | | INCOME TAX NON DEDUCTIBLE EXPENSES DESCRIPTION | REFERENCE | LENGTH | FV FIRST | 145 LAST |
|---|---|---|---|---|---|---|
| 1 | FV01$ | EVENT NUMBER | #12 | 8 | 1 | 8 |
| 2 | FV02$ | SUM DEBIT | | 12 | 9 | 20 |
| 3 | FV03$ | SUM CREDIT | | 12 | 21 | 32 |
| 4 | FV04$ | BALANCE | | 12 | 33 | 44 |
| 5 | FIL22$ | FILLER | | 100 | 45 | 144 |
| 6 | VL22$ | VALID (Y/N) | | 1 | 145 | 145 |

FIG. 2W

| #23 | | ARCHIVE OF RESERVES | | | FW | 145 |
|---|---|---|---|---|---|---|
| | REFERENCE | DESCRIPTION | LENGTH | | FIRST | LAST |
| 1 | FW01$ | DATE | 8 | | 1 | 8 |
| 2 | FW02$ | SUM DEBIT | 12 | | 9 | 20 |
| 3 | FW03$ | SUM CREDIT | 12 | | 21 | 32 |
| 4 | FW04$ | BALANCE | 12 | | 33 | 44 |
| 5 | FIL23$ | FILLER | 100 | | 45 | 144 |
| 6 | VL23$ | VALID (Y/N) | 1 | | 145 | 145 |

FIG. 2X

| #24 | | RULES FOR EARNINGS DISTRIBUTION | | | FX | 117 |
|---|---|---|---|---|---|---|
| | REFERENCE | DESCRIPTION | LENGTH | | FIRST | LAST |
| 1 | FX01$ | PERCENTAGE TO BE DISTRIBUTED | 6 | | 1 | 6 |
| 2 | FX02$ | DATE TO BE DISTRIBUTED | 4 | | 7 | 10 |
| 3 | FX03$ | PERCENTAGE THAT GOES TO RESERVES | 6 | | 11 | 16 |
| 4 | FIL24$ | FILLER | 100 | | 17 | 116 |
| 5 | VL24$ | VALID (Y/N) | 1 | | 117 | 117 |

FIG. 2Y

25  INCOME TAX PERCENTAGE

| | | DESCRIPTION | REFERENCE | LENGTH | FY FIRST | FY 123 LAST |
|---|---|---|---|---|---|---|
| 1 | FY01$ | DATE FROM | | 8 | 1 | 8 |
| 2 | FY02$ | DATE TO | | 8 | 9 | 16 |
| 3 | FY03$ | INCOME TAX PERCENTAGE | | 6 | 17 | 22 |
| 4 | FIL25$ | FILLER | | 100 | 23 | 122 |
| 5 | VL25$ | VALID (Y/N) | | 1 | 123 | 123 |

FIG. 2Z1

26  ARCHIVE OF PROFIT AND LOSS (AFTER SORTING)

| | | DESCRIPTION | REFERENCE | LENGTH | FZ FIRST | FZ 197 LAST |
|---|---|---|---|---|---|---|
| 1 | FZ01$ | EVENT NUMBER IN ARCHIVE | #12 | 8 | 1 | 8 |
| 2 | FZ02$ | DATE | | 8 | 9 | 16 |
| 3 | FZ03$ | ITEM (NUMBER IN MASTER FILE) | #4 | 8 | 17 | 24 |
| 4 | FZ04$ | MOVEMENT CODE (NUMBER IN MASTER FILE) | #8 | 8 | 25 | 32 |
| 5 | FZ05$ | QUANTITY | | 12 | 33 | 44 |
| 6 | FZ06$ | VALUE (DEBIT) | | 12 | 45 | 56 |
| 7 | FZ07$ | VALUE (CREDIT) | | 12 | 57 | 68 |
| 8 | FZ08$ | PLACE IN INVENTORY ITEM ANALYTICAL (BEFORE SORTING) | #5 | 8 | 69 | 76 |
| 9 | FZ09$ | PLACE IN INVENTORY ITEM ANALYTICAL (AFTER SORTING) | #6 | 8 | 77 | 84 |
| 10 | FZ10$ | BALANCE | | 12 | 85 | 96 |
| 11 | FIL26$ | FILLER | | 100 | 97 | 196 |
| 12 | VL26$ | VALID (Y/N) | | 1 | 197 | 197 |

FIG. 222

| #27 | RETAINED EARNINGS | DESCRIPTION | REFERENCE | LENGTH | GA FIRST | 145 LAST |
|---|---|---|---|---|---|---|
| 1 | GA01$ | DATE | | 8 | 1 | 8 |
| 2 | GA02$ | SUM DEBIT | | 12 | 9 | 20 |
| 3 | GA03$ | SUM CREDIT | | 12 | 21 | 32 |
| 4 | GA04$ | BALANCE | | 12 | 33 | 44 |
| 5 | FIL27$ | FILLER | | 100 | 45 | 144 |
| 6 | VL27$ | VALID (Y/N) | | 1 | 145 | 145 |

FIG. 3A

EXAMPLE OF : IMPACT CODE / MASTER FILE #7

| #S | | FG01$ | FG02$ | FG03$ | FG04$ | FG05$ | FG06$ | FG07$ | FG08$ | FG09$ | FG10$ | FG11$ | FG12$ |
|---|---|---|---|---|---|---|---|---|---|---|---|---|---|
| 1 | COLLECTION FROM SALES TO CUSTOMER VAT 9% 60 DAYS OF CREDIT | | Y | D | 60 | 0 | | 25 | | | | | N |
| 2 | VAT MONTHLY STATEMENT / SALES VAT 9% | | Y | F | | | | | | | | | Y |
| 3 | PAYMENT TO SUPPLIER(19% VAT 45 DAYS OF CREDIT) | | Y | D | 45 | 0 | 1 | 25 | N | | | | Z |
| 4 | VAT MONTHLY STATEMENT / PURCHASES AND EXPENSES 19% | | Y | F | | | 1 | 3 | Y | | | | Z |
| 5 | SOCIAL SECURITY | | Y | F | | 0 | 0 | 18 | | | | | Z |
| 6 | SALARIES PAYABLE / 1st INSTALLMENT | | Y | F | | 0 | 0 | 31 | | | | | Z |
| 7 | SALARIES PAYABLE / MONTH END | | Y | S | | | | | | | | | Z |
| 8 | INTEREST INCOME | | Y | S | | | | | | N | | | Z |
| 9 | WITHHOLDING OF INCOME TAX ON INTEREST INCOME | | Y | S | | | | | | | | | Z |
| 10 | INTEREST EXPENSE | | Y | S | | | | | N | | | | Z |
| 11 | TAX CONTRIBUTION OF LAW 128/75 | | Y | S | | | | | | | | | Z |
| 12 | DIVIDENDS | | Y | S | | | | | | | | | Z |
| 13 | RESERVES | | Y | S | | | | | | | | | Z |
| 14 | INCOME TAX PAYMENT | | Z | | | | | | | | | | Z |
| 15 | DEPRECIATION | | Y | | | | | | | | | | Y |
| 16 | PAYMENT OF VAT | | | | | | | | | | | | Z |
| 17 | RETAINED EARNINGS | | N | S | | | | | | | | | N |

EXAMPLE OF : MOVEMENT CODE / MASTER FILE DRAWING 3 #8

| #8 | | FH01$ | FH02$ | FH03$ | FH04$ | FH05$ | FH06$ | FH07$ | FH08$ | FH09$ | FH10$ | FH11$ | FH12$ | FH13$ | FH14$ | FH15$ |
|---|---|---|---|---|---|---|---|---|---|---|---|---|---|---|---|---|
| 1 | SALES (VAT 9% NOT INCLUDED) 60 DAYS OF CREDIT | | -100 | 0 | 6 | 109 | 2 | -9 | | 44.06 | | | | | N | 0 |
| 2 | SALARIES | | 128.06 | 0 | 6 | 42 | 7 | 42 | 5 | | | | | | N | 0 |
| 3 | EXPENSES (VAT 19% NOT INCLUDED) 30 DAYS OF CREDIT | | 100 | 0 | 3 | -119 | 4 | -19 | | | | | | | N | 0 |
| 4 | PURCHASES OF WAREHOUSE ITEMS (VAT 19% NOT INCLUDED) 45 DAYS OF CREDIT | | 0 | 0 | | -119 | 4 | -19 | | | | | | | N | 0 |
| 5 | WAREHOUSE ITEM'S OPENING BALANCE | | 0 | 0 | | | | | | | | | | | N | 0 |
| 6 | BANK ACCOUNTS OPENING BALANCE | | -100 | 0 | 8 | 100 | | | | | | | | | N | 0 |
| 7 | INTEREST INCOME | | 0 | 100 | 9 | -100 | | | | | | | | | N | 0 |
| 8 | WITHHOLDING OF INCOME TAX ON INTEREST INCOME | | 100 | 0 | 10 | -100 | | | | | | | | | Y | 0 |
| 9 | INTEREST EXPENSE | | 100 | 0 | 11 | -100 | | | | | | | | | N | 0 |
| 10 | TAX CONTRIBUTION OF LAW 128/75 | | 0 | 0 | | | | | | | | | | | N | 0 |
| 11 | DIVIDENDS | | 0 | 0 | 14 | 100 | | | | | | | | | N | 0 |
| 12 | PAYMENT OF INCOME TAX | | 100 | 0 | | 100 | | | | | | | | | N | 0 |
| 13 | COST OF GOODS SOLD | | 100 | 0 | | | | | | | | | | | N | 0 |
| 14 | DEPRECIATION OF MACHINERY 15% | | 0 | 0 | 16 | 100 | | | | | | | | | N | 0 |
| 15 | PAYMENT OF VAT | | 0 | 0 | | | | | | | | | | | N | 0 |
| 16 | RETAINED EARNINGS | | 0 | 0 | | | | | | | | | | | N | 0 |

FIG. 3B

COMPUTER-IMPLEMENTED METHOD FOR EVALUATING AN INVESTMENT

CROSS-REFERENCE TO RELATED APPLICATIONS

This application claims benefit from Greek Patent Application No. 20050100192, filed on Apr. 14, 2005, the contents of which are hereby incorporated herein by reference in its entirety.

BACKGROUND OF THE INVENTION

1. Field of the Invention

This invention relates broadly to computer-implemented financial analysis. More particularly, this invention relates to computer-implemented financial analysis methodologies for determining the profitability and the present value of an investment or entity over an investment period as well as products and systems based thereon.

2. State of the Art

In business, people often are confronted with the evaluation of the impact of an economic investment, which is a series of forecasted actions and events that produce and/or sell goods or services over a predetermined investment period. Such an economic investment can be part of an investment plan or an annual budget. In order to do evaluate the economic investment, a financial analyst (or a group of analysts) typically identifies and budgets incidents with respect to involved activities/departments (e.g., sales, production, expenses, purchases, payroll, collections, payments, etc). The incident values are used to calculate the profit and loss of the investment over the investment period. A net present value result is calculated based upon individual cash flow collections and payments. This net present value result provides a single monetary figure that characterizes whether the expected monies generated by the investment over the investment period will exceed the monies that are required to be paid out during the investment period. In this manner, the net present value result provides meaningful information that is often used as an important point in deciding whether or not the investment should be made.

Typically, the net present value result is derived by modeling the investment as a sequence of positive and negative cash collections. The cash collections (positive values) and payments (negative values) are discounted into their equivalents as of the date of the beginning of the investment, after taking into consideration the appropriate discount rate. That is to say in simple terms, if an annual interest rate of 10% is assumed, then the possession on Jan. 1, 2006 of a sum of 100 EUR is equivalent with the future collection of a sum of 105 EUR after 6 months. With this method, all cash collections and payments are discounted into net present values, and in the end they are added up. If the result is positive, the investment is profitable, while if it is negative it is a loss maker.

The general mathematical formula that is used to discount a future cash flow to its net present value is the following: the future cash flow is divided with a factor, which is the number 1 plus the interest rate of interest bearing period, but only after the factor is raised to the v power, where v is the total number of interest bearing periods. The result of that division is the net present value of the cash flow.

Such prior art net present value methodologies have significant limitations. First, implementation of the methodology is exceptionally difficult for complex investments that produce a large number of financial incidents over numerous dates. Second, the methodology is by its own nature exceptionally inaccurate, because situations with distinct differences are handled in the same manner. Moreover, there are often real and usual (even daily) situations for which it cannot give a suitable answer because of the inaccuracies built into the method. Finally, the method is incapable of generating a suitable answer for large investments because of the inaccuracies built into the method.

For example, the following real-life scenarios depict limitations of the prior art methodologies.

1. As a consequence of the multiple daily collections and payments, it is possible that for some days of the month the investment's bank account will have a negative cash balance and accordingly produce an interest expense (typically at a 6% interest rate for current lending rates), while certain other days of the month the investment's bank account will have a positive cash balance and accordingly produce interest income (typically at a 0.5% interest rate for current bank rates). The prior art methodologies are unable to and fail to determine daily bank account cash balances and thus are unable to determine if and when to apply such interest payments and interest credits. Such inabilities limit the accuracy of the underlying net present value calculation and analysis.

2. Similarly, under certain circumstances such as when the accounting balance (and not the valeur balance) is negative for the last calendar date of a given month, an additional tax contribution may be due by applicable tax statutes (e.g., the Greek Tax Law 128/75). Such tax contributions constitute a cash flow (expense). The prior art methodologies do not account for such tax contributions, which limit the accuracy of the underlying net present value calculation and analysis.

3. Similarly, from the interest income note in 1 above, there is a withholding of income tax from the bank at the date of interest calculation (a negative cash flow). Such income tax withholding is typically offset to a later date for year end tax calculations. The prior art methodologies do not account for such interest income and the tax consequences associated therewith, which limit the accuracy of the underlying net present value calculation and analysis.

4. The yearly net income of the investment is typically allocated into categories including a reserve fund, distributed dividends and retained earnings. The reserve fund carries over from year to year. Similarly, the retained earnings carry over into the following year and can be used for capital expenditures or other needs. The reserve fund and retained earnings remain in the entity. Thus, these accounts can affect the interest expense and/or interest income of the investment. Until their date of payment, distributed dividends can also affect the interest expense and/or interest income of the investment. The prior art methodologies do not account for such net income allocation and the interest credits and expenses associated therewith, which limit the accuracy of the underlying net present value calculation and analysis.

5. With regard to the monthly VAT payments, it is possible for a negative payment amount to be calculated in certain months, which means that negative payment is going to be carried forward in next month's payment, with financially beneficial results for the entity. The prior art methodologies do not account for such monthly VAT payments and the financial benefits associated therewith, which limit the accuracy of the underlying net present value calculation and analysis.

Thus, there remains a need in the art for improved financial analysis methodologies and tools that evaluate economic investments in a manner that is suitable for complex investments and in a manner that provides accurate results over a wide range of investments including complex and large investments.

SUMMARY OF THE INVENTION

It is therefore an object of the invention to provide a financial analysis methodology (and a tool based thereon) that evaluates an economic investment in a manner that is suitable for complex investments.

It is another object of the invention to provide such a financial analysis methodology (and a tool based thereon) that provides accurate results over a wide range of investments, including complex and large investments.

It is a further object of the invention to provide such a financial analysis methodology (and a tool based thereon) that accounts for daily calculations of a bank account, bank account interest payments and credits as well as bank account tax payments that may arise as the investment collects monies (e.g., calculated inflows) and pays monies (e.g., calculated outflows) over its investment period.

It is yet another object of the invention to provide such a financial analysis methodology (and a tool based thereon) that allows for allocation of the calculated net income into predetermined categories (e.g., distributed dividends, retained earnings, reserve fund), wherein certain categories (e.g., distributed dividends) contribute to the net present value of the investment and other categories (e.g., retained earnings, reserve fund) do not contribute to the net present value of the investment over certain parts of the investment period but contribute later.

It is also an object of the invention to provide such a financial analysis methodology (and a tool based thereon) that accurately accounts for value-added tax payments paid by the investment over the investment period.

It is still another object of the invention to provide such a financial analysis methodology (and a tool based thereon) that accurately accounts for calculated income taxes paid over the investment period.

In accord with these objects, which will be discussed in detail below, a computer-implemented method and corresponding tool includes software-based functionality that characterizes whether the expected net present value of monies generated by an investment over an investment period will exceed the net present value of monies that are required to be paid out during the investment period. Such software-based functionality derives and stores forecasted and calculated inflows and forecasted and calculated outflows over the investment period. The inflows and the outflows are stored and managed in one or more computer data structures. The calculated inflows are derived from one or more of the following: i) forecasted sales of the investment over the investment period, ii) calculated bank account interest credits of the investment that are to be collected over the investment period, and possibly iii) other forecasted and/or calculated inflows of the investment that are to be collected over the investment period. The calculated outflows are derived from one or more of the following: i) forecasted and/or calculated incidents (e.g., inventory costs, labor cost, overhead) related to costs of goods or services sold of the investment over the investment period, ii) forecasted and/or calculated expenses of the investment over the investment period, iii) forecasted depreciation of fixed assets of the investment over the investment period, iv) calculated value-added tax payments of the investment that are to be paid over the investment period, v) calculated income tax payments of the investment that are to be paid over the investment period, vi) calculated bank account interest debits of the investment that are to be paid over the investment period, vii) calculated bank account tax payments of the investment that are to be paid over the investment period, and possibly viii) other forecasted and/or calculated outflows of the investment that are to be paid over the investment period. The functionality processes the forecasted and/or calculated inflows and the forecasted and/or calculated outflows to derive a net income for each year in the investment period. An allocation rule is used to apportion the net income for each given year to predefined accounts. Such predefined accounts may include distributed dividends, retained earnings, and possibly reserves. The distributed dividends represent a portion of the profits of the investment that is shared by the investor(s) for the given year. Retained earnings represent a portion of the profits of the investment that is kept for future use or investment. Reserves represent a portion of the profits of the investment that must be reserved as dictated by statutory regulations or possibly other rules. The net income portions that are allocated to certain accounts (e.g., net income allocated to distributed dividends) for each given year over the investment period and possibly the value of other items that exist at the end of the investment period are discounted to their net present value as of the starting date of the investment. This first net present value result is used to evaluate the investment.

In the preferred embodiment, a comparison is made between the first net present value result and a second net present value result characterizing the money payments (or possibly other items) that will be paid/contributed to the investment over the investment period by the investor or investing entity. This comparison can be realized by subtracting the second net present value from the first net present value and outputting (e.g., by display or by a printed report) the result to the user. If the result is positive, the investment is profitable, while if it is negative it is a loss maker. The magnitude of the result characterizes the amount of forecasted profit (or loss) of the investment over the investment period.

Additional objects and advantages of the invention will become apparent to those skilled in the art upon reference to the detailed description taken in conjunction with the provided figures.

BRIEF DESCRIPTION OF THE DRAWINGS

FIGS. 1A-1C, collectively, is a flow chart of a computer-implemented methodology for evaluating an investment in accordance with the present invention.

FIGS. 2A-2Z2, collectively, are schematic representations of exemplary computer files for carrying out the computer-implemented methodology of FIGS. 1A-1C.

FIGS. 3A-3B are schematic representations of the computer files of FIGS. 2G and 2H for use in an illustrative application.

DETAILED DESCRIPTION OF THE PREFERRED EMBODIMENTS

Figure 4:
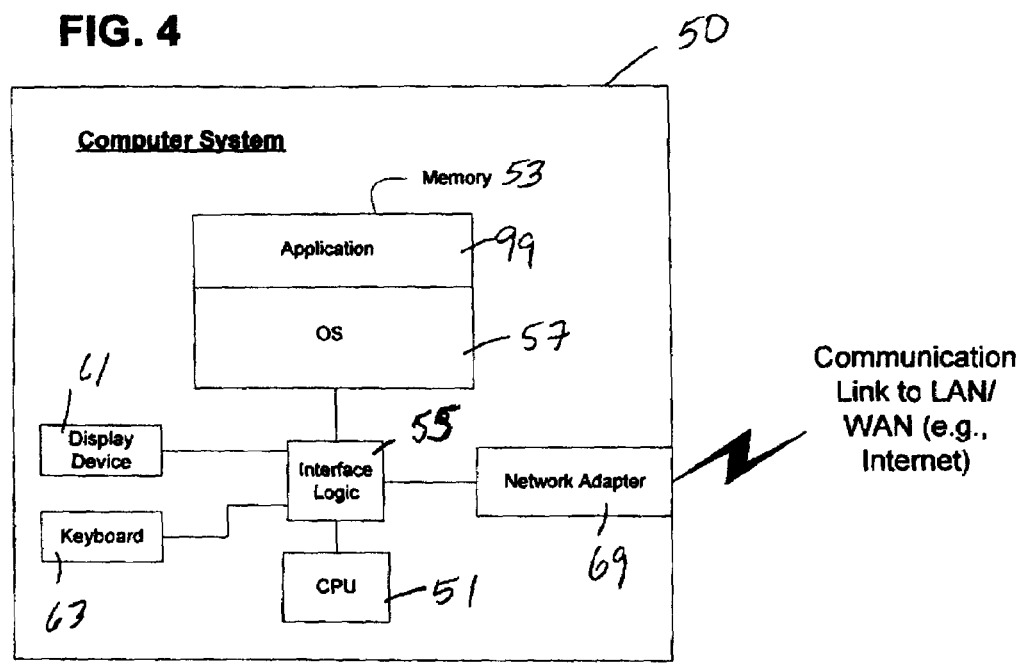
FIG. 4 is a functional block diagram of an exemplary computer processing system in which the present invention can be embodied.

Turning now to FIG. 4, there is shown an exemplary computer system that can be used to execute the computer-implemented financial analysis methodologies of the present invention as described herein. The computer system can be any of a number of computer devices including a personal computer, laptop, workstation, server and the like. The computer system includes a central processor unit 51 that is interfaced to memory 53 by interface logic 55. The memory 53, which is typically realized by persistent memory (such as one or more ROM memory modules and/or one or more flash memory modules) as well as non-persistent memory (such as one or more DRAM modules), stores an operating system 57 as well as an application 99, which is referred to below as the "investment evaluation value application". The central processor unit 51 also interfaces to a display device 61 (e.g., a liquid crystal display panel), a keypad or keyboard 63 and/or other user input device (e.g., a touch screen disposed on the display device 61) and possibly other devices (e.g., a microphone for voice input and one or more speakers for voice/audio output. The central processor unit 51 may also interface to a communication subsystem 69 that provides for bidirectional communication with a communication network (e.g., a local area network and/or a wide area network, such as the Internet). The operating system 57 and the investment evaluation application 99 are typically stored in a storage device, such as magnetic disk drive or disk array (not shown), and loaded into memory 53 as needed. The investment evaluation application 99 may also be stored on a program storage device (e.g., an optical storage disk such as a CD-ROM or DVD) and loaded/installed onto the storage device of the computer system 50 via an optical disk drive or the like. The investment evaluation application 99 may also be stored on a remote computer and loaded/installed onto the storage device of the computer system 50 via the communication network (e.g., downloaded over the Internet).

The investment evaluation application 99 includes software-based functionality that characterizes whether the expected net present value of monies generated by an investment over an investment period will exceed the net present value of monies that are required to be paid out during the investment period. Such software-based functionality calculates and stores forecasted and/or calculated inflows and forecasted and/or calculated outflows over the investment period. The inflows and outflows are stored and managed in one or more computer data structures stored on the computer system 50 or accessible therefrom. Such data structures can be one or more data files, one or more data tables stored as part of a relational database, or any other data structure used to persistently store data. The forecasted and/or calculated inflows are derived from one or more of the following: i) forecasted sales of the investment over the investment period, ii) calculated bank account interest credits of the investment that are to be collected over the investment period, and possibly iii) other forecasted and/or calculated inflows of the investment that are to be collected over the investment period. The forecasted and/or calculated outflows are derived from one or more of the following: i) forecasted and/or calculated incidents (e.g., inventory costs, labor cost, overhead) related to costs of goods or services sold of the investment over the investment period, ii) forecasted and/or calculated expenses of the investment over the investment period, iii) forecasted depreciation of fixed assets of the investment over the investment period, iv) calculated value-added tax payments of the investment that are to be paid over the investment period, v) calculated income tax payments of the investment that are to be paid over the investment period, vi) calculated bank account interest payments of the investment that are to be paid over the investment period, vii) calculated bank account tax payments of the investment that are to be paid over the investment period, and possibly viii) other forecasted and/or calculated outflows of the investment that are to be paid over the investment period. The application 99 processes the forecasted and/or calculated inflows and the forecasted and/or calculated outflows to derive a calculated net income for each year in the investment period. An allocation rule is used to apportion the calculated net income for each given year to predefined accounts. Such predefined accounts may include distributed dividends, retained earnings, and possibly reserves. The distributed dividends represent a portion of the profits of the investment that is shared by the investor(s) for the given year. Retained earnings represent a portion of the profits of the investment that is kept for future use or investment. Reserves represent a portion of the profits of the investment that must be reserved as dictated by statutory regulations or possibly other rules. The net income portions that are allocated to certain accounts (e.g., net income allocated to distributed dividends) for each given year over the investment period and possibly the value of other items that exist at the end of the investment period are discounted to their net present value as of the starting date of the investment. This first net present value result is used to evaluate the investment.

In the preferred embodiment, a comparison is made between the first net present value result and a second net present value result characterizing the money payments (or possibly other items) that will be paid/contributed to the investment over the investment period. This comparison can be realized by subtracting the second net present value from the first net present value and outputting (e.g., by display or by a printed report) the result to the user. If the result is positive, the investment is profitable, while if it is negative it is a loss maker. The magnitude of the result characterizes the amount of forecasted profit (or loss) of the investment over the investment period.

In the preferred embodiment, the software-based functionality of the investment evaluation application 99 embodies the methodology shown in FIGS. 1A through 1C and described below in more detail. The methodology begins in block 101 wherein the data stored in one or more master files is initialized. The one or more master files store necessary data that is used in the operations of the application 99, such as data identifying the working days in each year of the investment period, income tax payment installment dates and values, item codes for stock materials and other warehouse items used in manufacturing, stock level policies for the warehouse items which define the respective quantity levels of the warehouse items that trigger restocking and the corresponding restocking quantity and possibly other inventory information, data that defines the allocation rule for net income as described herein, and/or possibly other data. Such data can be initially set to a default value and updated by user input, or can be set to a predefined value by design.

In block 103, the operations collect forecasts of financial incidents relevant to the investment or entity (e.g., forecasted sales, forecasted expenses, fixed assets for the investment, depreciation schedules or rule(s) for the fixed assets, stock materials and other warehouse items for production and other information related thereto, etc). Such collection can be accomplished by a graphical user interface providing for user input, by batch loading of such data from a file, or by other suitable means.

In block 105, a value and date for each forecasted sale as defined by the data stored in block 103 is added to an event list. For instances where VAT taxes are applicable, the value added tax collected as part of the sale could be calculated and included in the value of the forecasted sale. For example, consider a value added tax of 9% for at item sold for 100 EUR. The VAT tax would be (100*0.09) EUR=9 EUR, and the value for the sale of the item would be (100+9) EUR=109 EUR.

For manufacturing-type investments and entities, optional block 107 may be carried out to collect or generate a list of warehouse item costs (e.g., raw material costs), associated direct labor costs and associated overhead costs that are required to meet the forecasted sales incidents as defined by the data stored in block 103. In the preferred embodiment, the required warehouse item costs also satisfy constraints that are dictated by the stock level policies of the master file as initialized in block 101. The warehouse item costs, direct labor costs and overhead costs are then added as values and dates to the event list.

The operations of block 107 can be adapted for different types of investments. For example, service-type investments or entities typically do not manufacture a product and thus the financial analysis typically does not involve forecasted warehouse items. In such instances, the operations of block 107 can be adapted to collect and store forecasted labor costs and forecasted overhead costs over the years of the investment. Similarly, merchandizing-type investments or entities typically do not manufacture a product and thus the financial analysis typically does not involve warehouse items. In these instances, the operations of block 107 can be adapted to collect and store stock purchase costs over the years of the investment period.

In block 109, the operations calculate a costs of goods sold value for each year of the investment period. For manufacturing-type investments and entities, the cost of goods sold for a given year is preferably derived from the data derived and stored in block 107 as follows:

(value of the warehouse item inventory at the start of the given year)+(calculated warehouse item costs for the given year)−(value of the warehouse item inventory at the close of the given year)+(forecasted labor costs for the given year)+(forecasted overhead costs for the given year).

Other cost of goods calculations can be used as well. For example, works in progress inventory and finished product inventory can be modeled throughout the year and valued as part of the costs of goods calculation. For service-type investments or entities, the costs of goods sold becomes costs of service sold, which is typically calculated by adding the labor costs for the given year to the overhead costs for the given year. For merchandizing-type investments or entities, the cost of goods sold is typically derived by adding the following:

(value of the stock inventory at the start of the given year)+(calculated stock purchase costs for the given year)−(value of the stock inventory at the close of the given year).

Other costs of goods sold calculations can be used as well.

In block 111, the operations calculate gross profits for each year of the investment period. In the preferred embodiment, the gross profits for a given year is derived as follows:

(forecasted sales for the year)−(costs of goods sold for the year as calculated in block 109).

Other gross profit calculations can be used as well.

In block 113, a value and date for each forecasted expense as defined by the data stored in block 103 is added to the event list.

In block 115, depreciation values and dates for each fixed asset as defined by the data stored in block 103 are generated and added to the event list. Preferably, the depreciation values and dates for the fixed assets of the investment are derived from a depreciation schedule or rule defined by the data stored in block 103.

In block 117, if applicable, VAT payment values and dates are calculated based upon the forecasted sales of the investment as defined by the data stored in block 103. Preferably, the VAT payment values are derived for each given sale by multiplying the sales price times a predetermined VAT percentage value (e.g., 9%). The date for a given VAT payment is preferably defined by the applicable tax statute (e.g., under the tax laws of Greece, VAT payments are due on the $25^{th}$ of the month immediately following the invoice issue date). VAT values and dates are calculated based upon the forecasted and/or calculated purchases and expenses of the investment. Typically, a negative monthly VAT balance (payments—credits) is carried over into the next month. The VAT payments and credits (values and dates) are added to the event list. Other tax payments (e.g., social security payments) can also be added as values and dates to the event list.

In blocks 119 to 147, the operations perform a nested loop over the years, months and working days of the investment period. Blocks 123 to 133 define an inner loop that is performed for each working day of the investment period. Blocks 121 to 137 define an intermediate loop that is performed for each month of the investment period. And blocks 119 to 147 define an outer loop that is performed for each year of the investment period.

As part of this inner loop, block 125 calculates a daily balance adjustment based upon the sales, warehouse inventory purchases, expenses, fixed asset depreciation values, tax payments and possibly other values stored in the event list. Preferably, the daily balance adjustment is calculated for a given working day by subtracting the debit values of the event list for the given working day from the credit values of the event list for the given day. In block 127, a bank account balance is updated by adding the daily balance adjustment to the opening day's balance, which is carried forward from the previous day's closing balance. In block 129, it is determined whether the bank account balance for the given working day is negative. If so, a bank account interest payment is calculated for the given working day (preferably, by multiplying the bank account balance by a predetermined interest rate percentage as defined in block 101), the bank account interest payment is deducted from the bank account balance, and the bank account interest payment is added as a value and date to the event list. In block 131, it is determined whether the bank account balance for the given working day is positive. If so, a bank account interest credit is calculated for the given working day (preferably, by multiplying the bank account balance by another predetermined interest rate percentage as defined in block 101), the bank account interest credit is added to the bank account balance, and the bank account interest credit is added as a value and date to the event list. Other suitable calculations can be used as well. For example, similar bank account interest payment and credit calculations can be calculated on the month end bank account balance as part of the loop of blocks 121 to 137.

As part of the intermediate loop of blocks 121 to 137, block 135 determines whether the bank account balance at the end of a given month is negative. If so, a tax payment, under certain laws such as a 128/75 tax payment due under Greek law, may be due. In this case, the resulting tax payment is calculated (preferably, by multiplying the bank account balance for the given month by a predetermined tax rate as defined in block 101), the tax payment is deducted from the bank account balance on its proper date, and the tax payment is added as a value and date to the event list.

As part of the outer loop of blocks 119 to 147, block 139 calculates and stores the taxable income of the investment for the given year. This taxable income calculation is preferably derived as follows:

(Gross Profits for given year YRi)−(Deductible
Expenses for YRi)−(Deductible Tax Payments
for YRi)+(Non-Deductible Bank Account Interest
Credits for YRi)−(Deductible Bank Account
Interest Payments for YRi)−(Deductible Bank
Account Tax Payments for YRi)

Other suitable calculations can be used as well.

In block 141, the final income tax payment for the given year is calculated and stored based upon the taxable income calculated in block 139. Preferably, the final income tax payment for the given year is calculated by subtracting the income tax installments paid in the given year from the taxable income calculated in block 139. The final income tax payment is added as a value and date to the event list. In addition, the income tax installments that are to be paid in the following year are calculated and stored (preferably, in accordance with a given rule such as a predetermined percentage of the taxable income paid in the given year). Such income tax installments are then added as values and dates to the event list.

In block 143, the net income for the given year is calculated preferably by adjusting the taxable income as derived in block 139 to reflect the total income tax paid for the given year as well as other non-deductible expenses and outflows and other deductible credits and inflows. Preferably, the net income for the given year is calculated as follows:

(Taxable Income for given year YRi)−(Non-Deductible Expenses For YRi)+(Deductible Bank
Account Interest Credits For YRi)−(Non-Deductible Bank Account Interest Payments For YRi)−
(Non-Deductible Tax Payments For YRi)−(Income Tax Payments For YRi)

Other suitable net income calculations can be used as well.

In block 145, the net income as calculated in block 143 is allocated to predefined accounts in accordance with an allocation rule defined in block 101. The value of each account for the given year is updated, if necessary, and stored. In the preferred embodiment, such predefined accounts include distributed dividends, retained earnings, and possibly reserves as described above.

After completing the outer loop, the operations continue to block 149 to calculate a first net present value for the investment. Preferably, the first net present value is based on the net income portions that are allocated to certain accounts (e.g., net income allocated to distributed dividends) over the investment period in block 145, possibly the value of other items (fixed assets, reserve fund, retained earnings, bank account balance) that exist at the end of the investment period, and possibly the value of other derivative cash flows (payment of income tax and payment of dividends or other collections and/or payments) that remain to take place after the investment period. In particular, each one of these values is discounted to its net present value as of the starting date of the investment and added together to store a resultant sum, which is the first net present value. This first net present value result is preferably output to the user (e.g., via display or printed report) for use in evaluating the investment.

Finally, in block 151, a comparison is made between the first net present value result of block 149 and a second net present result characterizing the money payments (or possibly other items) that will be paid/contributed to the investment over the investment period. In particular, each one of these money payments or other items is discounted to its net present value as of the starting date of the investment and added together to store a resultant sum, which is the second net present value. The comparison of block 151 is preferably realized by subtracting the second net present value from the first net present value and outputting (e.g., by display or by a printed report) the result to the user. If the result is positive, the investment is profitable, while if it is negative it is a loss maker. The magnitude of the result characterizes the amount of profit (or loss) of the investment over the investment period.

Figure 1B:
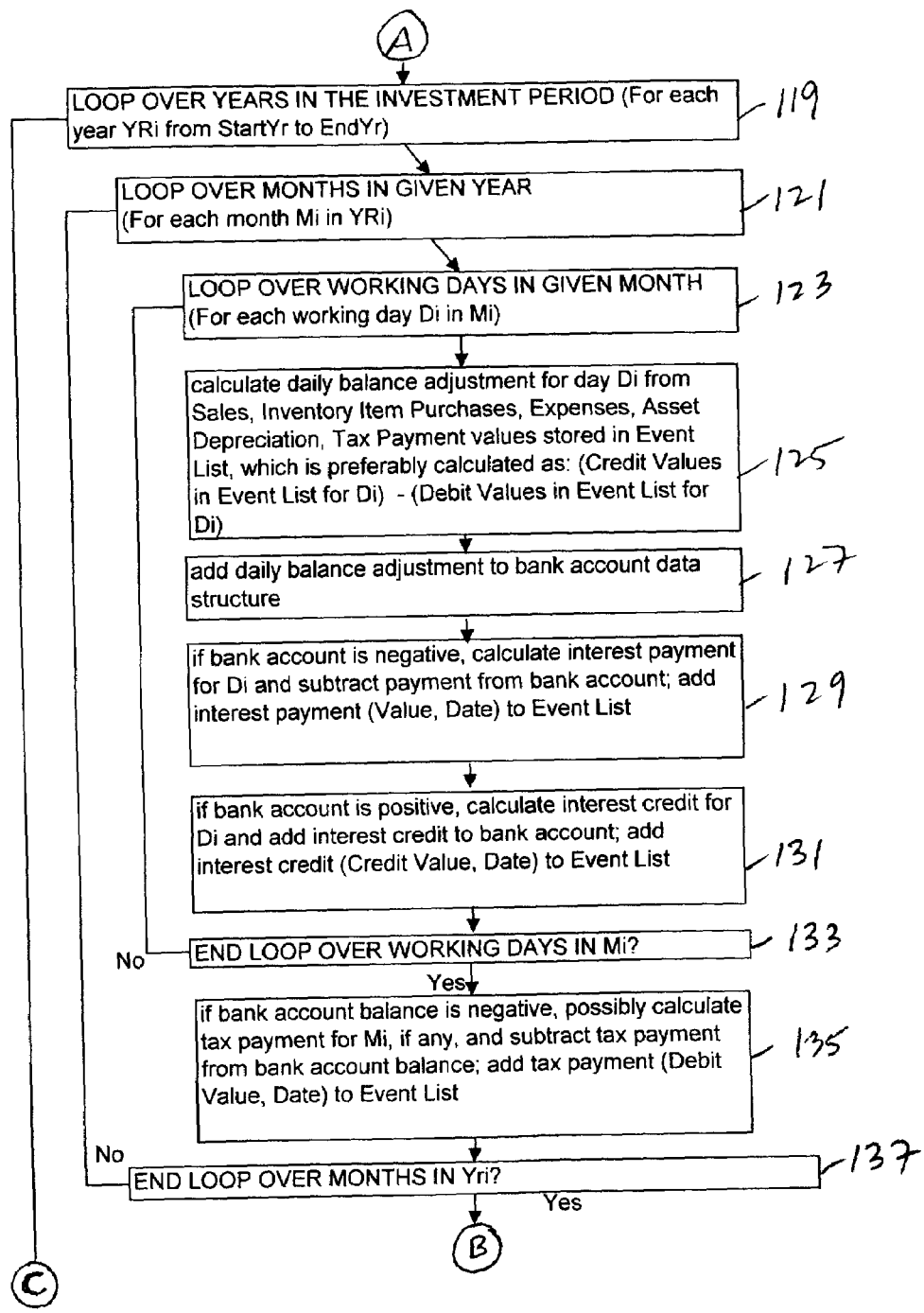
Figure 1C:
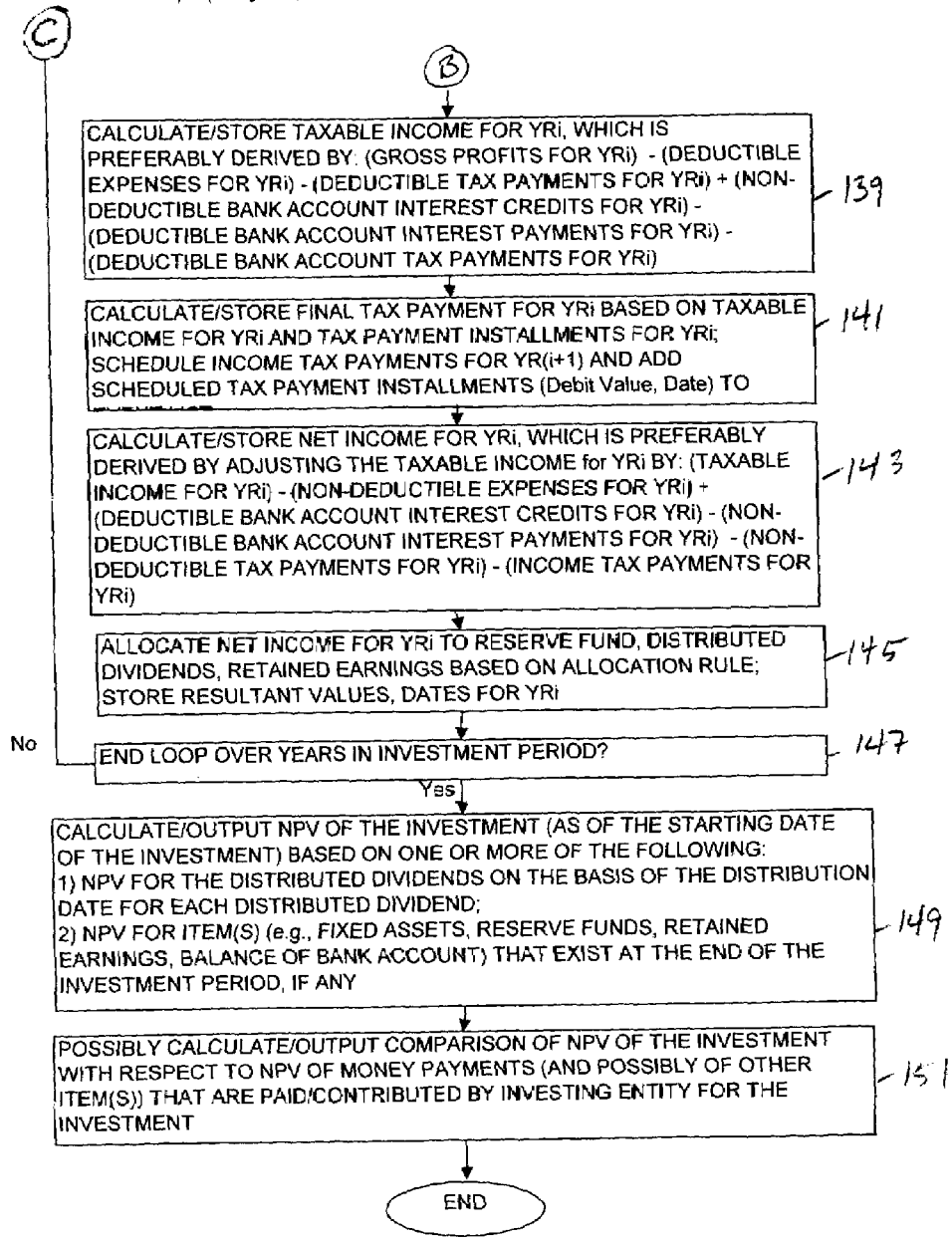

The operations of FIGS. 1A-1C as described above can be realized by a wide variety of programming environments, languages and/or data constructs. An exemplary realization is illustrated by the schematic diagrams of FIGS. 2A-2Z2, which describe a set of computer files that are part of an application written in the widely known computer programming language TURBO BASIC. This TURBO BASIC application carries out the operations of FIGS. 1A-1C as described herein.

Note that the symbols #1, #2 and so on, correspond to channels of communication with their respective computer files. Names such as FA01$, FB01$ etc are the names of the fields in the files. In the end of each file, field FILXX$ (where XX is the number from the corresponding channel of communication) is empty space (filler), and field VLXX$ (where XX is the number from the corresponding channel of communication) is the field that shows if the particular entry is active or voided.

As shown in FIG. 2A, the file set includes a "SYSTEM.INF" file, which is to say the code list of the code lists. It includes basic information such as the name of code file (FA01$), and how many entries have been added up to that moment in this code file (FA02$). The number of the line of registration corresponds to the number of the channel of communication.

The file set also includes at least one calendar master file as shown in FIG. 2B, which describes the days in a given year of the investment period. Note that field FB03$ indicates if the particular day is a working day or not, and is used to identify working days in the inner loop of blocks 123 to 133. The fields FB04$ and FB05$ are used to store calculated bank account interest credits and payments, respectively, over the investment period. These bank account interest values and corresponding dates that are stored in the file of FIG. 2B are used in block 125 to adjust the bank account of the investment on its proper date.

The file set also includes at least one income tax schedule master file as shown in FIG. 2C, which defines the month and day values that income tax installments are to be paid over the investment period. This information is used in block 117 and in block 141 to calculate and record scheduled income tax payments.

The file set also includes an inventory item mater file as shown in FIG. 2D, which includes codes (field FD01$)) for raw material, products, packaging materials etc) and a stock level policy of each code (fields FD07$ to FD11$). This file also defines expenses. Note that inventory items and expenses are distinguishable by the value of field FD12$.

The file set also includes an inventory analytical file as shown in FIG. 2E, which maintains (in no particular) order the sales entries of block 105. These entries are sorted by date (FE04$) to generate the sorted analytical file of FIG. 2F. The daily balances of the file of FIG. 2F and the information of FD07$-FD11$ is used in block 107 to calculate the requisite warehouse item purchases, which are added as entries in the file of FIG. 2E. The file of FIG. 2E is sorted again by date (FE04$) to generated the sorted file of FIG. 2F. As part of block 111, the information in the file of FIG. 2F is used in conjunction with a generally acceptable accounting method (such as FIFO, Mean Average or another equivalent) to calculate the residual value of year end stock.

The file set also includes an impact code master file and a movement code master file as shown in FIGS. 2G and 2H, respectively, which collectively define dates and effects that various forecasted incidents will have in calculating the bank account balance and the profit and loss of the investment. The impact codes of FIG. 2G define the dates for such incidents and the periodicity of payment (bimonthly, quarterly, semi-annual, annual etc). The movement codes of FIG. 2H define the effect of such incidents on the bank account balance of the investment, such as whether it has an effect on the profit and loss account (FH02$) and the relative percentage of it, if it is an advance payment of income tax (FH03$), if it is a reserve fund (FH14$), if it is an expense that is income tax wise non-deductible, and the relative percentage of it (FH15$). The movement codes are also linked to the corresponding impact codes (FH04$, FH06$, FH08$, FH10$, FH12$) as well as define the corresponding sum of cash flow that is created, as a percentage of the registered sum (FH05$, FH07$, FH09$, FH11$, FH13$). An exemplary description of the information contained in the impact code master file and a movement code master file is shown in FIGS. 3A and 3B.

The file set also includes a bank interest rate master file as shown in FIG. 2I, which defines the interest rates for the calculation of interest on the bank account balance (FI03$, FI05$) as part of block 129, with indication of date from and until (FI01$, FI02$), the percentage for the calculation of tax contribution of law 128/75 (FI043$) as part of block 135, the rate for the retaining of income tax on interest income (FI06$) as part of block 131, the days of valeur for check deposits (FI07$), which is the number of days before interest credits are realized with respect to a deposit of a customer's check and used in block 125, and the days of valuer for check payments (FI08$), which is the number of days before interest payments are realized with respect to a check payment sent to a supplier and used in block 125.

The file set also includes an interest bearing period master file as shown in FIG. 2J, which describes the time periods in which interest is charged and/or credited to the bank account balance of the investment. Field FJ02$ is the flag the program puts when the interest calculation of this period has been performed. This information can be used to dictate when bank account interest and credit calculations are performed.

The file set also includes a gross income calculation file as shown in FIG. 2K, which stores information generated in blocks 105 and 107 (sales, purchases and year opening balances) which is derived from the data stored in the event archive file of FIG. 2L. It also stores the year end valuation of residual stocks, which is calculated in block 109. In this manner, the balance of this file is the gross operating income of the investment.

The file set also includes an event archive file as shown in FIG. 2L, which contains the forecasted data (i.e. forecasted sales and expenses) as well as other data that the application calculates (such as VAT payments, income tax payments, etc.).

The file set also includes a bank account master file as shown in FIG. 2M, which defines the period for bank account interest calculations (e.g., calculate interest every X number of months).

The file set also includes two sorted bank account files as shown in FIGS. 2N and 2O. The file of FIG. 2N maintains bank account entries in no particular order. These entries are sorted by accounting date (FN01$) to generate the file of FIG. 2O, which is used in block 135. The file of FIG. 2N is sorted by value date (FN02$) to generate the file of FIG. 2P, which is used in blocks 129 and 131. An example that illustrates the differences and the use of the bank account files of FIGS. 2N, 2O and 2P follows:

| Accounting Date | Value Date | Sum Debit | Sum Credit | Balance | | |
|---|---|---|---|---|---|---|
| FIG. 2N (#14) | | | | | | |
| May 02 2006 | May 02 2006 | | 900.00 | | | |
| May 01 2006 | May 01 2006 | | 8,000.00 | | | |
| May 01 2006 | May 03 2006 | 10,000.00 | | | | |
| FIG. 2O (#15) | | | | | | |
| May 01 2006 | May 01 2006 | | 8,000.00 | −8,000.00 | | |
| May 01 2006 | May 03 2006 | 10,000.00 | | 2,000.00 | | |
| May 02 2006 | May 02 2006 | | 900.00 | 1,100.00 | | |
| Accounting Date | Value Date | Sum Debit | Sum Credit | Balance | Interest rate | Daily Interest |
| FIG. 2P (#16) | | | | | | |
| May 01 2006 | May 01 2006 | | 8,000.00 | −8,000.00 | 6.00% | −1.3151 |
| May 02 2006 | May 02 2006 | | 900.00 | −8,900.00 | 6.00% | −1.4630 |
| May 01 2006 | May 03 2006 | 10,000.00 | | 1,100.00 | 0.50% | 0.0151 |

The daily interest calculation is based on a 365 year calendar base. The sorting functionality is very similar to the one described above with respect to FIGS. 2E and 2F.

The file set also includes an NPV rate master file as shown in FIG. 2U, which defines percentage values (along with including dates valid from and until) for the final calculation of NPV as part of blocks 149 and 151.

The file set also includes a VAT archive file as shown in FIG. 2R, which store VAT related entries generated in blocks 105 and 113. These entries are sorted by date (FR02$) to generate the file of FIG. 2S. The system calculates the month end balance of the VAT entries of FIG. 2S. If the month end balance is a credit, then the system creates a new entry that represents the payment that will happen on the date designated for VAT paying to the tax authority. The system then resorts the file of FIG. 2R to regenerate the file of FIG. 2S and moves to the next month. If the month end balance is a debit, then there is no payment and the system continues to the next month end date.

The file set also includes an allocation rule mater file as shown in FIG. 2X, which defines a formula for allocating net income (e.g., income after the deduction of income tax) to distributed earnings, retained earnings and possibly a reserve fund as part of block 145.

The file set also includes an income tax percentage master file as shown in FIG. 2Y, which defines relevant income tax percentages (along with including dates valid from and until) for the calculation of income tax as part of block 139.

As part of block 105, the forecasted sales are added as inflows to the event archive file, with the operations making an automatic entry in the gross operating income calculation file of FIG. 2K. The sorted bank account file of FIG. 2N is updated by way of FL03$, #8, FH04$-FH06$-FH08$-FH10$-FH12$, #7, FG02$, FG03$ to FH11$, #14. That is to say that FL03$ is used to identify the number of the movement code in the file of FIG. 2H (#8). The file of FIG. 2H (#8) is opened to retrieve the entry pointed to in FL03$. In FH04$, FH06$, FH08$, FH10$, and FH12$ the system identifies the number of movement codes in the file of FIG. 2G (#7). The file of FIG. 2G (#7) is opened to retrieve the entries pointed in FH04$, FH06$, FH08$, FH10$, and FH12$. In each of them, in file FG02$ there is the information if that particular entry will have effect on the bank account. If the answer is yes, then in fields FG03$ to FG11$ the system finds the info to calculate the exact date this impact will take place. Then the entry is stored in the bank account file of FIG. 2N (#14).

As part of block 105, the inventory quantities that are required for the beginning balance of each year of the investment period are stored along with appropriate movement codes. On the basis of the initial inventory balances, an analytical list of movements of warehouse items (e.g., raw material, packaging materials etc is calculated. This list is shown in FIG. 2E, which is sorted on the basis of the date of entry to generate the sorted list of FIG. 2F. Up to this moment the analytical list of movements has only the sales (and possibly the beginning balance). On the basis of the stock level policy, which is portrayed in the master file of FIG. 2D (FD07$, FD08$, FD09$, FD10$, FD11$), the operations calculate the purchases that must take place on a per item basis and automatically creates entries in the events archive file of FIG. 2L along with the bank account file of FIG. 2N, the gross operating profit calculation file of FIG. 2K, the VAT archive of FIG. 2R, and the inventory item list of FIG. 2E. The inventory list of FIG. 2E is sorted to generate the sorted inventor list of FIG. 2F, which is used to determine the year end balance of each inventory item for the fiscal year. Up to this moment, the gross operating profit calculation file of FIG. 2K contains the sales, the beginning balance and the purchases of the year. The beginning and year end balances of warehouse items can be valued through some generally accepted accounting method (e.g. mean average, FIFO etc). The result of this valuation is entered into the gross operating profit calculation file of FIG. 2K. At this point, the balance of the gross operating profit calculation file of FIG. 2K represents the gross profit of the investment for the given year. Such operations are repeated for each successive year in the investment period in order to calculate and store the gross profit for each year of the investment period (blocks 109-111).

As part of block 113, the forecasted expenses are added to the event archive of FIG. 2L, to the sorted bank account of FIG. 2N, and to the profit and loss archive of FIG. 2Q by way of FL03$, #8, FH02$, #17. That is to say that FL03$ is used to identify the number of the movement code in the file of FIG. 2H (#8). The file of FIG. 2H (#8) is opened up to retrieve the entry pointed in FL03$. In FH02$, the system finds information that represents what percentage of the value of the movement goes to the profit and loss account. Then the system creates the related entry in the file of FIG. 2Q (#17) with the calculated amount. The forecasted expenses are also added to the VAT archive of FIG. 2R, and to the expense list of FIG. 2V on the basis of field FH15$ of FIG. 2H.

As part of block 115, the operations automatically calculate and store fixed assets depreciations in the event archive list of FIG. 2L, in the expense list of FIG. 2V and in the profit and lost archive file of FIG. 2Q.

As part of block 117, the VAT archive file of FIG. 2R is updated by way of FLO3$, #8, FH04$-FH06$-FH08$-FH10$-FH12$, #7, FG12$, #18. That is to say that FL03$ is used to identify the number of the movement code in the file of FIG. 2H (#8). The file of FIG. 2H (#8) is opened to retrieve the entry pointed in FL03$. In FH04$, FH06$, FH08$, FH10$, and FH12$, the system identifies the number of movement codes in the file of FIG. 2G (#7). The file of FIG. 2G (#7) is opened to retrieve the entries pointed in FH04$, FH06$, FH08$, FH10$, and FH12$. In each of these entries, in file FG12$ there is the information if that particular entry will have effect on the VAT calculation. If the answer is yes, then in fields FG03$ to FG11$ the system finds the info to calculate the exact date this impact will take place. Then the entry is stored in the VAT archive file of FIG. 2R (#18). The VAT archive file of FIG. 2R (#18) is sorted to generate the sorted VAT archive file of FIG. 2S (#19). The payment dates (FR02$ and FS02$) are created after taking into consideration fields FG03$ up to FG11$. The system checks if at the date of payment the balance is to be paid or to be carried forward for the next statement of VAT, and it automatically updates the event archive file of FIG. 2L and the bank account file of FIG. 2N. At this stage, other payments to the government and to other government related organizations are calculated (e.g. Social Security, salary income tax, income tax on payment of freelancers, auxiliary social security organizations etc), with the exception of the income tax of the entity. The follow up of these issues calls for the creation of intermediary files, as in the case of VAT.

As part of block 125, the operations sort, on the basis of the date, the entries of the bank account file of FIG. 2N to generate the sorted bank account files of FIGS. 2O and 2P. The sorted bank account files are used to derive the daily balance adjustments and bank account interest and credit calculations of blocks 125 through 131, and the operations create a corresponding entry in the event archive file of FIG. 2L, in the bank account file of FIG. 2N and the profit and loss archive of FIG. 2Q. Each bank account interest payment and credit is recorded in field FB04$ and FB05$, respectively, of the calendar master file of FIG. 2B. The month end bank account balance is used to calculate the tax contribution of the relevant law, such as the 128/75 tax of Greece (FI04$), if any, and the operations create a corresponding entry in the event archive file of FIG. 2L, in the bank account file of FIG. 2N and the profit and loss archive of FIG. 2Q. The result per date is written in FB04$ and FB05$. Specifically, for the retaining of income tax from interest income (FI06$), the created movement (No 8 in the attached example of code list of movements of #8) will be taken into consideration later in the payment of income tax for the fiscal year's earnings.

As part of block 139, the operations sort the profit and loss archive of FIG. 2Q and automatically create the sorted profit and loss archive of FIG. 2Z1. The balance of the last date of the fiscal year is the net profit before taxes. The expense list of FIG. 2V is used to identify the expenses that are income tax wise non-deductible, which is used to adjust the fiscal year balance of the sorted profit and loss archive of FIG. 2Z1 to provide the total taxable income for the fiscal year. This result is multiplied by the income tax rate identified in the income tax percentage file of FIG. 2Y in order to find the total income tax that is to be paid for the fiscal year. A final income tax payment is calculated that is equal to the balance of the total income tax less the income tax installments paid during the fiscal year (FIG. 2C). The operations then schedule income tax payments that are to be paid in the following year (preferably in accordance with a rule based on a predetermined percentage of total tax due in the current fiscal year) and create new entries for these scheduled income tax payments in the event archive of FIG. 2L and the bank account file of FIG. 2N.

As part of block 143, the operations add to the net profit the sum of tax non deductible expenses (as found in the file of FIG. 2V (#22)) and arrives at a sum that is the basis for the income tax calculation, or in other words the taxable income. The information in the file of FIG. 2Y (#25) defines the rate with which the taxable income must be multiplied in order for the sum of income tax to be calculated.

As part of block 145, the operations follow the allocation rule define in the master file of FIG. 2X to allocate the net income (after taxes) to distributed dividends, retained earnings and a reserve fund. The net income portion allocated to the reserve fund, if any, is added as an entry in the event archive of FIG. 2L and the reserve archive of FIG. 2W. The net income portion allocated to distributed dividends, if any, is added as an entry in the event archive of FIG. 2L and to the bank account file of FIG. 2N. The net income portion allocated to retained earnings, if any, is added as an entry in the event archive of FIG. 2L and to the retained earning file of FIG. 2Z2.

This procedure is repeated for successive fiscal years over the investment period.

As part of block 149, the operations discount (thru the use of the NPV rate file of FIG. 2U) the following specific sums into net present values as of the date of the beginning of the investment plan:
1. The distributed dividends on the basis of their date of payment, which are stored as entries in the events archive file of FIG. 2L (#12), with the use of movement code number 11 in the file of FIG. 2H (#8), as seen on examples of FIG. 2H (#8) in FIG. 3B.
2. The value of the reserve funds (FIG. 2W) on the basis of the date of the end of the investment.
3. The value of retained earnings (FIG. 2Z2) on the basis of the date of the end of the investment.
4. The commercial value (according to our evaluation) of the remaining fixed assets (machinery, buildings etc) and the remaining elements of asset (merchandise, raw material etc) on the basis of the date of the end of the investment.
5. The balance of the bank account (FIG. 2N) on the basis of the date of the end of the investment.
6. Any remaining derivative cash flows (payment of income tax and payment of dividends) that remain to take place in the next fiscal year, on the basis of the date that they will be realized. For these cash flows, a basic calculation of NPV can be used. A precise determination of financial cost (not including the effect of compound interest) is not needed because the differences are insignificant and do not essentially influence the final result.

Finally, in block 151, a comparison is made between the first net present value result of block 149 and a second net present value result characterizing the money payments (or possibly other items) that will be paid/contributed to the investment over the investment period. In particular, each one of these money payments or other items is discounted to its net present value as of the starting date of the investment and added together to store a resultant sum, which is the second net present value result. The comparison of block 151 is preferably realized by subtracting the second net present value result from the first net present value result and outputting (e.g., by display or by a printed report) the result to the user. If the result is positive, the investment is profitable, while if it is negative it is a loss maker. The magnitude of the result characterizes the amount of forecasted profit (or loss) of the investment over the investment period.

The computer-implemented investment evaluation application described herein provides many important benefits over the prior art methodologies, including, but not limited to:
i) accounting for bank account interest payments and credits as well as bank account tax payments that may arise as the investment collects monies (e.g., calculated inflows) and pays monies (e.g., calculated outflows) over the investment period;
ii) allowing for allocation of the calculated net income into predetermined categories (e.g., distributed dividends, retained earnings, reserve fund) wherein certain categories (e.g., distributed dividends) contribute to the net present value of the investment and other categories (e.g., retained earnings, reserve fund) do not contribute to the net present value of the investment over certain parts of the investment period;
iii) accurately accounting for calculated income taxes paid over the investment period; and
iv) accurately accounting for value-added tax payments paid by the investment over the investment period.

These benefits provide a greater degree of accuracy in modeling the finances of the investment over the investment period and thus provide decision makers with accurate information that can be effectively used to determine whether or not to make the investment.

There have been described and illustrated herein several embodiments of a computer-implemented method for evaluating an investment and a financial analysis application based thereon. While particular embodiments of the invention have been described, it is not intended that the invention be limited thereto, as it is intended that the invention be as broad in scope as the art will allow and that the specification be read likewise. Thus, while particular data structures and formulaic expressions have been disclosed, it will be appreciated that other data structures can be used as well. In addition, while particular calculations have been disclosed for determining particular terms (such as costs of goods sold, gross profits, taxable income, net income, etc.), it will be understood that other calculations can be used. Also, while particular calculations have been disclosed for discounting forecasted inflows and outflows to a net present value, it will be recognized that other discounting-type calculations can be used as well. It will therefore be appreciated by those skilled in the art that yet other modifications could be made to the provided invention without deviating from its spirit and scope as claimed.

What is claimed is:
1. A computer-implemented method carried out by a computer processing system for user evaluation of an investment in a business entity over a predefined investment period comprising: storing data on the computer processing system, the data representing values and corresponding dates of a plurality of inflows and a plurality of outflows over the investment period, wherein said data includes at least the following: ai)

values and dates of forecasted sales, aii) values and dates for forecasted expenses, and aiii) value and dates for forecasted tax payments, including forecasted income tax payments; processing the data on the computer processing system to calculate a plurality of first values based on the data, said plurality of first values representing benefits that will be derived from the investment over corresponding intervals of the investment period, wherein said plurality of first values account for each of the following: bi) interest payments and interest credits using respective appropriate interest rates on calculated daily bank account balances that are derived from said data, bii) calculated income tax payments derived from said data, and biii) annual allocation of calculated net income into a plurality of predetermined categories, wherein at least one of said plurality of predetermined categories contribute to said first values, and wherein at least another of said plurality of predetermined categories do not contribute to said first values over at least parts of the investment period; generating a first net present value result on the computer processing system by discounting said plurality of first values; and storing said first net present value result on the computer processing system for output to a user as part of evaluation of the investment.

2. A computer-implemented method according to claim 1, wherein: said data further includes at least one of: aiv) values and dates for inventory item purchases that are required to meet predetermined constraints including said forecasted sales, and av) values and dates for depreciations of at least one forecasted fixed asset.

3. A computer-implemented method according to claim 1, wherein: said plurality of first values further account for at least one of: biv) value added tax payments that are derived from said data, and by) tax payments due on calculated daily bank account balances that are derived from said data.

4. A computer-implemented method according to claim 1, further comprising: generating on the computer processing system at least one second value representing one or more investment contributions to be made in the business entity over of the investment period; generating a second net present value result on the computer processing system by discounting said at least one second value; and storing said second net present value result on the computer processing system for output to the user as part of evaluation of the investment.

5. A computer-implemented method according to claim 4, further comprising: comparing said first net present value result and said second net present value result; and storing a result of the comparing step on the computer processing system for output to the user as part of evaluation of the investment.

6. A computer-implemented method according to claim 5, wherein: the comparing subtracts the second net present value result from the first net present value result.

7. A computer-implemented method according to claim 5, further comprising: outputting the result of the comparing step to the user for evaluation of the investment.

8. A computer-implemented method carried out by a computer processing system for user evaluation of an investment in a business entity over a predefined investment period comprising: storing data on the computer processing system, the data representing values and corresponding dates of a plurality of inflows and a plurality of outflows over the investment period, wherein said data includes at least one of the following: ai) values and dates for inventory item purchases that are required to meet predetermined constraints including forecasted sales, aii) values and dates for depreciations of at least one forecasted fixed asset, aiii) values and dates for forecasted expenses, and aiv) values and dates for forecasted tax payments; processing the data on the computer processing system to calculate a plurality of first values based on the data, said plurality of first values representing benefits that will be derived from the investment over corresponding intervals of the investment period, wherein said plurality of first values account for at least one of the following: bi) interest payments and interest credits using respective appropriate interest rates on calculated daily bank account balances that are derived from said data, bii) tax payments due on calculated daily bank account balances that are derived from said data, biii) value added tax payments that are derived from said data, biv) calculated income tax payments derived from said data, and by) allocation of calculated net income into a plurality of predetermined categories, wherein at least one of said plurality of predetermined categories contribute to said first values, and wherein at least another of said plurality of predetermined categories do not contribute to said first values over at least parts of the investment period; generating a first net present value result on the computer processing system by discounting said plurality of first values; and storing said first net present value result on the computer processing system for output to a user as part of evaluation of the investment.

9. A computer-implemented method according to claim 8, further comprising: generating on the computer processing system at least one second value representing one or more investment contributions to be made in the business entity over the investment period; generating a second net present value result on the computer processing system by discounting said at least one second value; and storing said second net present value result on the computer processing system for output to the user as part of evaluation of the investment.

10. A computer-implemented method according to claim 9, further comprising: comparing said first net present value result and said second net present value result; and storing a result of the comparing step on the computer processing system for output to the user as part of evaluation of the investment.

11. A computer-implemented method according to claim 10, wherein: the comparing subtracts the second net present value result from the first net present value result.

12. A computer-implemented method according to claim 10, further comprising: outputting the result of the comparing step to the user for evaluation of the investment.

13. A computer-implemented method according to claim 8, wherein: said predetermined constraints of ai) include a stock level policy related to said inventory items.

14. A computer-implemented method according to claim 8, wherein: said data is used to derive and store bank account balances on a daily basis.

15. A computer-implemented method according to claim 8, wherein: said data includes impact codes and movement codes that dictate how and when financial incidents are integrated into calculations that are part of the method.

16. A computer-implemented method according to claim 8, wherein: said first values are derived from calculations of net income.

17. A computer-implemented method according to claim 16, wherein: said calculations of net income are derived from calculations of costs of goods sold, gross profit, and income tax paid.

18. A computer-implemented method according to claim 8, wherein: said predetermined categories are selected from the group including distributed dividends, a reserve fund, and retained earnings, wherein said distributed dividends contribute to said first values, and wherein said reserve fund and said retained earnings do not contribute to said first values over at least parts of the investment period.

19. A computer-implemented method according to claim 8, wherein: said first net present value result is generating by discounting other items that exist at the end of the investment period, said other items selected from the group including: i) value of reserve funds on the basis of the date of the end of the investment period, ii) value of retained earnings on the basis of the date of the end of the investment period, iii) value of the remaining assets on the basis of the date of the end of the investment period, iv) value of the calculated daily bank account balance on the basis of the date of the end of the investment period, and v) value of any other remaining balance sheet items and any remaining derivative cash flow that will take place after the investment period on the basis of the date that such cash flow will be realized.

20. A computer readable medium readable by a machine, tangibly embodying a program of instructions executable by the machine to perform method steps for evaluating an investment in a business entity over a predefined investment period, said method steps comprising: storing data representing values and corresponding dates of a plurality of inflows and a plurality of outflows over the investment period, wherein said data includes at least one of the following: ai) values and dates for forecasted sales, aii) values and dates for depreciations of at least one forecasted fixed asset, aiii) values and dates for forecasted expenses, and aiv) values and dates for forecasted tax payments; calculating a plurality of first values that represent benefits that will be derived from the investment over corresponding intervals of the investment period, wherein said plurality of first values account for at least one of the following: bi) interest payments and interest credits using respective appropriate interest rates on calculated daily bank account balances that are derived from said data, bii) tax payments due on calculated daily bank account balances that are derived from said data, biii) value added tax payments that are derived from portions of said data corresponding to forecasted values and calculated values of the investment, biv) calculated income tax payments derived from said data, and bv) allocation of calculated net income into a plurality of predetermined categories, wherein at least one of said plurality of predetermined categories contribute to said first values, and wherein at least another of said plurality of predetermined categories do not contribute to said first values over at least parts of the investment period; generating a first net present value result by discounting said plurality of first values; and storing said first net present value result for output as part of evaluation of the investment.

21. A computer readable medium according to claim 20, said method steps further comprising: generating at least one second value that represents one or more investment contributions to be made in the business entity over the investment period; generating a second net present value result by discounting said at least one second value; and storing said second net present value result for output as part of evaluation of the investment.

22. A computer readable medium according to claim 21, said method steps further comprising: comparing said first net present value result and said second net present value result; and storing a result of the comparing step for output as part of evaluation of the investment.

23. A computer readable medium according to claim 22, wherein: the comparing subtracts the second net present value result from the first net present value result.

24. A computer readable medium according to claim 22, said method steps further comprising: outputting the result of the comparing step to a user for evaluation of the investment.

25. A computer readable medium according to claim 20, wherein: said predetermined constraints of ai) include at least one of a stock level policy related to said inventory items.

26. A computer readable medium according to claim 20, wherein: said data is used to derived calculated bank account balances on a daily basis.

27. A computer readable medium according to claim 20, wherein: said data includes impact codes and movement codes that dictate how and when financial incidents are integrated into calculations that are part of the method.

28. A computer readable medium according to claim 20, wherein: said first values are derived from calculations of net income.

29. A computer readable medium according to claim 28, wherein: said calculations of net income are derived from calculations of costs of goods sold, gross profit, and income tax paid.

30. A computer readable medium program storage device according to claim 20, wherein: said predetermined categories are selected from the group including distributed dividends, a reserve fund, and retained earnings, wherein said distributed dividends contribute to said first values, and wherein said reserve fund and said retained earnings do not contribute to said first values over at least parts of the investment period.

31. A computer readable medium according to claim 20, wherein: said first net present value result is generating by discounting other items that exist at the end of the investment period, said other items selected from the group including: i) value of reserve funds on the basis of the date of the end of the investment period, ii) value of retained earnings on the basis of the date of the end of the investment period, iii) value of the remaining assets on the basis of the date of the end of the investment period, iv) value of the calculated daily bank account balance on the basis of the date of the end of the investment period, and v) value of any other remaining balance sheet items and any remaining derivative cash flow that will take place after the investment period on the basis of the date that such cash flow will be realized.

32. A computer readable medium according to claim 20, which is embodied by an optical disk.

33. A computer readable medium according to claim 20, which is embodied by a computer system that allows for downloading of the program of instructions that perform the method steps of claim 20.

* * * * *

UNITED STATES PATENT AND TRADEMARK OFFICE
CERTIFICATE OF CORRECTION

PATENT NO.        : 7,668,768 B2                                          Page 1 of 1
APPLICATION NO. : 11/279259
DATED             : February 23, 2010
INVENTOR(S)       : Charalampos Oikonomidis It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 851 days.

Signed and Sealed this

Seventh Day of December, 2010

David J. Kappos
*Director of the United States Patent and Trademark Office*